Jan. 5, 1937.　　　R. C. HOFFMAN　　　2,066,530
MOTOR VEHICLE
Filed Dec. 1, 1932　　　2 Sheets-Sheet 1

INVENTOR
Roscoe C. Hoffman.
BY
Harness, Dickey, Pierce & Hann.
ATTORNEYS.

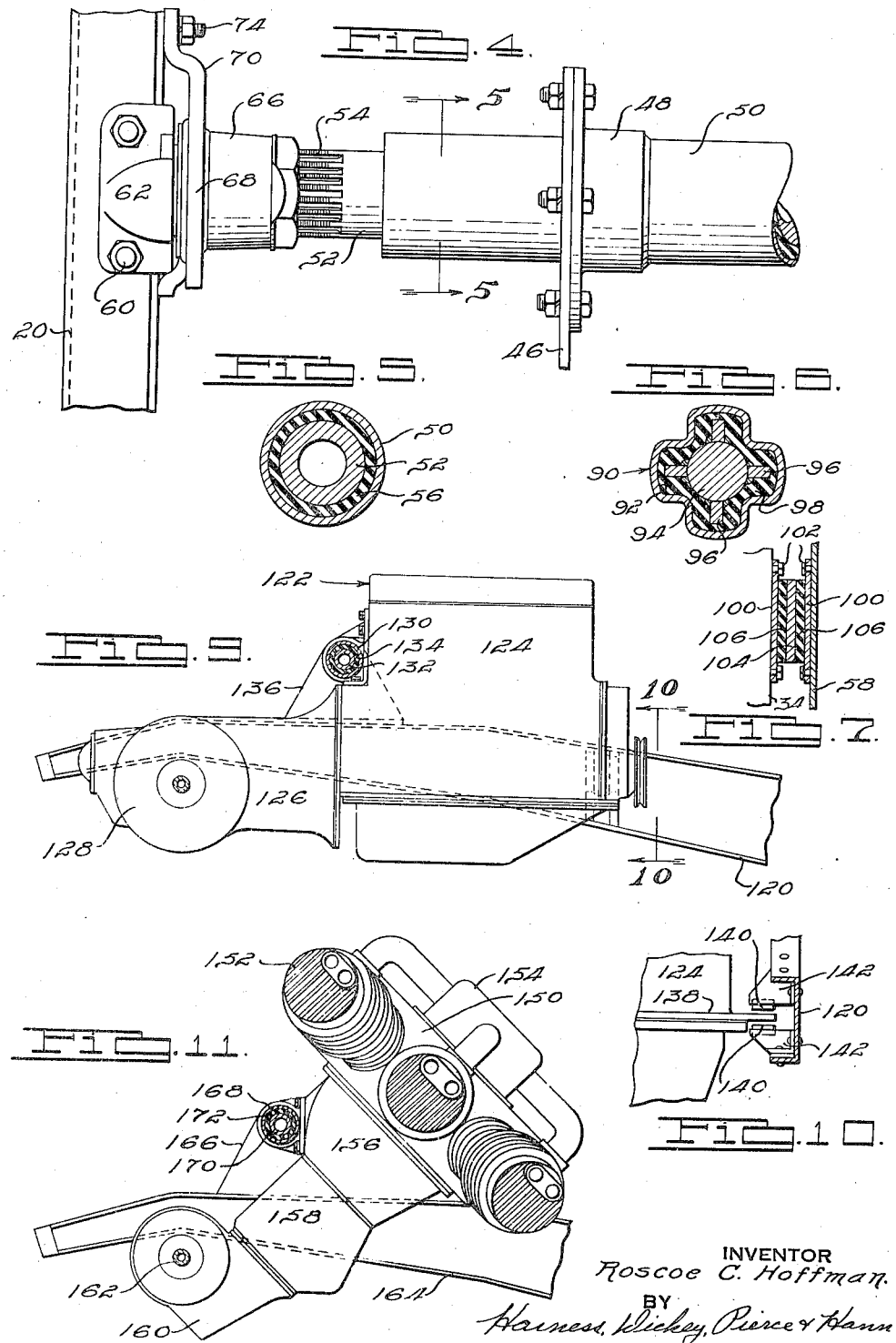

Patented Jan. 5, 1937

2,066,530

UNITED STATES PATENT OFFICE 2,066,530

MOTOR VEHICLE

Roscoe C. Hoffman, Detroit, Mich.

Application December 1, 1932, Serial No. 645,219

19 Claims. (Cl. 180—54)

This invention relates to motor vehicles and particularly to an improved mounting for the power plant units thereof, the principal object being the provision of a new and novel mounting for the power plant or power plant unit of a motor vehicle.

Objects of the invention include the provision of resilient means for mounting a power plant in a motor vehicle for rocking movement in a fore and aft direction with respect to the length of the vehicle; to provide resilient means for supporting substantially the entire weight of the engine of a motor vehicle for rocking movement about a line transverse to the length of the vehicle; to provide resilient means for supporting the power plant of a motor vehicle for rocking movement about an axis extending transversely to the length of the vehicle and proximate to the center of mass of the power plant unit; and to provide means for supporting a power plant in the motor vehicle whereby torque and torque reaction as well as brake reaction are cushioned through rocking movement of the power plant in a fore and aft direction.

Other objects of the invention are to provide means for supporting a power plant in a motor vehicle including one or more members rigid with respect to the power plant and one or more members rigid with respect to the vehicle frame, the respective members being so secured together through a cushion of rubber as to permit the engine to rock about a substantially horizontal axis disposed transversely to the length of the vehicle frame; to provide a tubular member fixed to the power plant of a motor vehicle, a member extending through the tubular member and fixed to the frame of the motor vehicle, and a bond of yieldable rubber between the tube and the member; and to provide an engine support including inner and outer members secured together in spaced relation by an interposed layer of rubber vulcanized thereto, one of the members being fixed with respect to an engine and the other of the members being fixed with respect to a support.

Another object of the present invention is to provide a novel means for securing an engine-supporting element to a vehicle chassis frame.

A further object is to provide a novel power plant construction for motor vehicles.

The above being among the objects of the present invention, the same consists of certain novel features of construction and combinations of parts to be hereinafter described with reference to the accompanying drawings, and then claimed, having the above and other objects in view.

In the accompanying drawings which illustrate suitable embodiments of the present invention and in which like numerals refer to like parts throughout the several different views, Figure 1 is a more or less diagrammatic plan view of the chassis of a motor vehicle.

Fig. 4 is a fragmentary plan view of the structure shown in Fig. 3.

Fig. 5 is a sectional view taken on the line 5—5 of Fig. 4.

Fig. 6 is a view similar to Fig. 5 but illustrating a modified form of construction.

Fig. 7 is a fragmentary sectional view illustrating a modified construction for supporting the power plant of a motor vehicle in the chassis thereof.

Fig. 9 is a more or less diagrammatic partially broken, partially sectioned side elevational view illustrating the application of the present invention to a front wheel drive type of motor vehicle construction employing a conventional type of engine, transmission and final drive mechanism.

Fig. 10 is a fragmentary sectional view taken as on the line 10—10 of Fig. 9 and illustrating one form of means for limiting rocking movement of the engine about its supporting axis.

Fig. 11 is a view similar to Fig. 9 but including a novel form of power plant construction forming a further part of the present invention.

Figure 1:
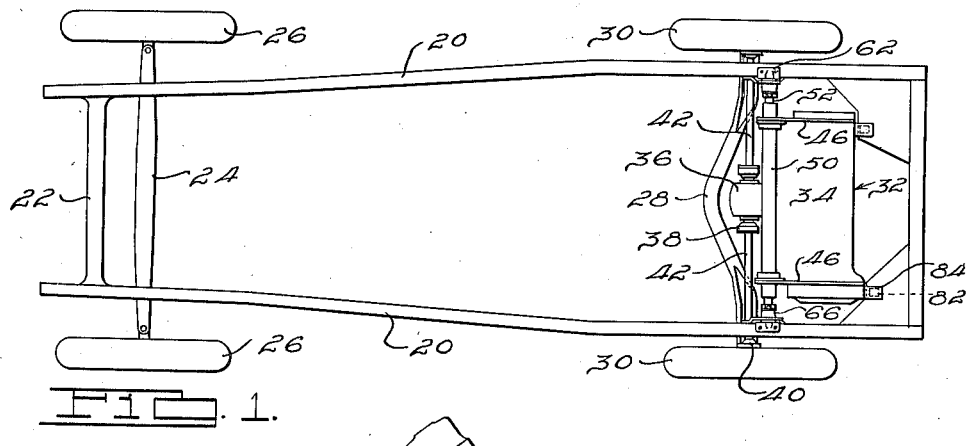

Referring to Fig. 1, I illustrate a motor vehicle including chassis frame side members or rails 20 and cross members 22, front axle 24, front wheels 26, rear axle 28 carrying rear wheels 30, and a power plant for the vehicle indicated generally as at 32. The power plant 32 includes an internal combustion engine 34 and a final drive gear mechanism 36 driven therefrom preferably by means of a novel construction disclosed and claimed in my copending application for Letters Patent of the United States for improvements in Motor vehicle filed on even date herewith, Serial No. 645,218, the final drive mechanism 36 being connected to the rear wheels 30 for driving movement by means of universal joints 38 and 40 and interconnecting axle or jack shafts 42.

Figures 2, 8:
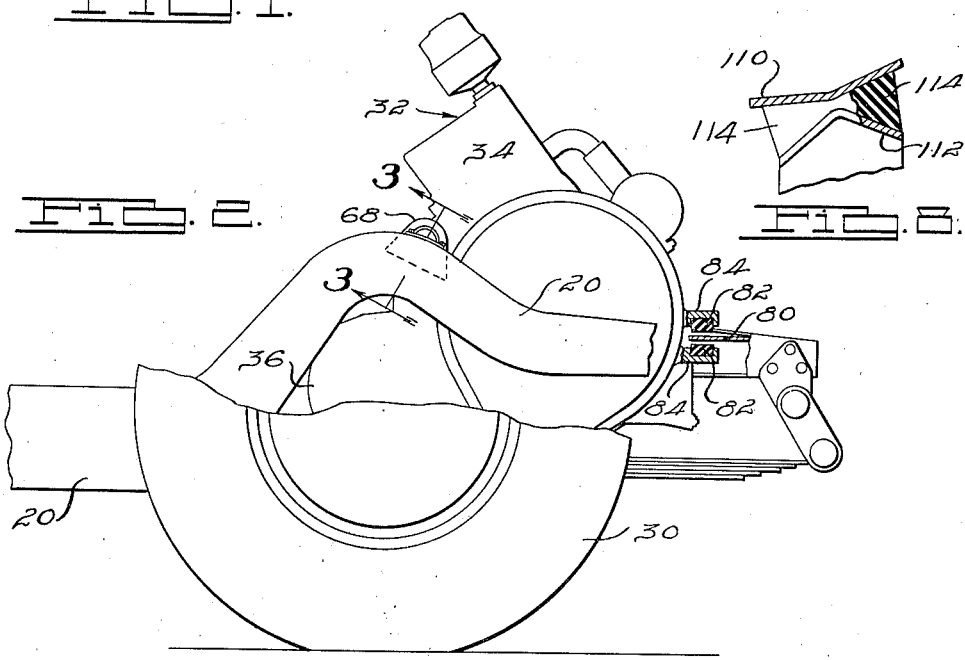
Fig. 2 is an enlarged fragmentary partially broken, partially sectioned side elevational view of the rear portion of the motor vehicle chassis shown in Fig. 1.
Fig. 8 (Sheet 1) is another fragmentary, partially broken, partially sectioned view illustrating another modified form of construction for supporting a power plant in a motor vehicle chassis.
Figure 3:
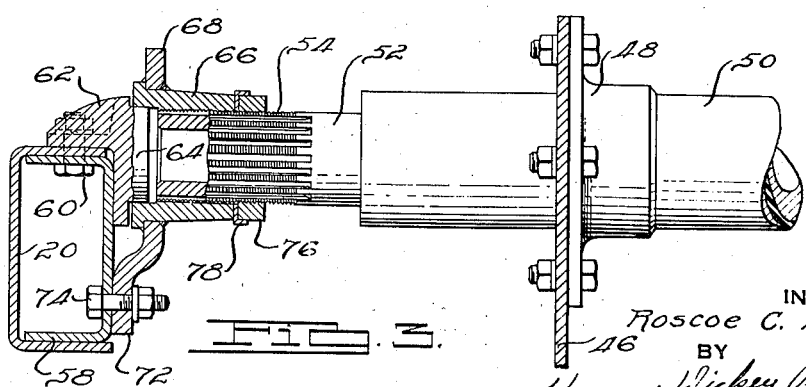
Fig. 3 is an enlarged fragmentary sectional view taken as on the line 3—3 of Fig. 2 illustrating the form of connection between the vehicle chassis frame and the motor support.

As explained in my copending application, in this form of power plant unit the cylinder block of the engine 34 is tipped forwardly relative to the axis of the engine crank shaft, as indicated in Fig. 2, and as indicated in Fig. 1 a plate member 46 is secured to each end of the engine 34, which is disposed transversely of the length of the vehicle, and projects forwardly of the cylinder block thereof, and into the forwardly facing V formed between the cylinder block and the final drive mechanism 36. As also indicated in Figs. 3 and 4, each of the plates 46 has fixed thereto a tubular bracket 48 and received within and between the brackets 48 and projecting beyond each of them is a tube 50 fixed to the brackets. Extending through the tube 50 and projecting beyond each end thereof is a tubular shaft 52 the outer ends of which are splined and threaded at 54 in Fig. 3. As indicated in Fig. 5, the tube 50 and shaft 52 are concentric and the outer surface of the shaft 52 is located in spaced relation with respect to the inner surface of the tube 50 and this space is filled with rubber 56 of a relatively soft nature and preferably vulcanized or otherwise fixed to the cooperating surfaces of the tube 50 and shaft 52.

The chassis frame side rails 20 adjacent the ends of the shaft 52 are each provided with an internal reinforcement 58 in the form of a channel member nested within the channel of the frame side member 20 and in opposed relation thereto. Secured to this reinforced portion of the frame by means of bolts such as 60 is a bracket member 62 having a cylindrical pilot portion 64. Piloted upon the portion 64 is a sleeve 66, the bore of which is splined for interengaging reception of the corresponding end 54 of the shaft 52. The sleeve 66 has fixed thereto as by welding a member 68 provided with a forwardly extending arm 70 and a downwardly extending arm 72, the end portions of which are outwardly bent for contact with the inner face of the reinforcing member 58. Suitable securing means such as bolts 74 are employed for connecting the arms 70 and 72 to the reinforcing element 58 and by this means the member 68 and, therefore, the sleeve 66 is prevented from relative rotation on the pilot 64. The ends 54 of the shaft 52 being splined in the sleeve 66, the shaft 52 is thereby positively held against relative rotation with respect to the frame side members 20.

A nut 76 is threaded on each end 54 of the shaft 52 and each of them is adapted to press the corresponding sleeve 66 outwardly. In practice the nuts 76 are tightened sufficiently to snugly press the arms 70 and 72 against their corresponding members 58 and then the nuts are locked in such position by means of a lock washer or similar member 78. By this means the shaft 52 is securely maintained against relative axial movement with respect to the chassis side frame members 20.

It will be observed that the shaft 52 and the parts connecting it with the engine 34 serve as a sole means for supporting the engine 34 in the vehicle frame and that because of the soft rubber connecting the shaft 52 and the tube 50, the engine 34 and parts fixed with respect to it are allowed a limited amount of rocking movement about the axis of the shaft 52, and at the same time any vibratory movement of the engine is insulated by the rubber 56 from transmission to the vehicle frame through direct metallic contact. Furthermore, it will be apparent that the engine 34 in transmitting torque to the wheels 30 through the shafts 42, will tend to rock about the axis of the shaft 52, and the rubber 56 will yieldingly resist such rocking movement. This is of great advantage due to the fact that sudden variations in the torque being transmitted will be cushioned through a corresponding rocking movement of the engine 34, and any jerk or shock which would otherwise be apparent will be considerably reduced. The same movement, but in a reverse direction, will also be apparent upon application of the brake to the vehicle while the engine and wheels are positively connected together. In both cases the yieldable mounting for the engine forms, in effect, a cushioned drive between the wheels and the engine with all of the attendant advantages thereof.

In order to realize the greatest benefits from this construction during usual driving conditions, a softer grade of rubber 56 is preferably employed than would be the case where the rubber 56 was employed as the sole means for limiting the rocking movement of the engine, and in such cases, and in order to limit the rocking movement of the engine within reasonable limits, additonal means are provided for this purpose and, while any suitable means may be provided, I have shown in Fig. 2 by way of example a plate member 80 fixed to a frame side rail 20 and which plate member 80 projects between a pair of spaced rubber blocks 82 carried by spaced brackets 84 fixed to the engine 34, the rubber blocks 82 being spaced from the plate when the rubber 56 between the shaft 52 and tube 50 is not actively transmitting power reactions between the engine and the wheels. Obviously, the spacing of the rubber blocks 82 may be varied in accordance with the characteristics of the rubber 56 and desired rocking characteristics of the engine 34.

The particular construction illustrated between the shaft 52 and the frame side rails 20 is provided particularly with the end in view of easy mounting and dismounting of the motor unit including the engine 34 from the vehicle frame. Referring particularly to Fig. 3, it will be noted that if the nuts 76 are backed away from their respective sleeves 66 a sufficient amount, and the fastening means 74 between the arms 70 and 72 of the member 68 and the reinforcing member 58 released, the sleeves 66 may be caused to follow the nuts 76 inwardly until they are clear of the inner ends of the pilots 64, at which time the shaft 52, engine 34 and connected parts may be moved laterally with respect to the pilot 64 and moved clear of the frame. A reversal of these operations will, of course, secure the shaft in position with respect to the frame. This construction provides a quick and easy means for mounting the motor unit in the vehicle frame and dismounting it therefrom.

It will, of course, be obvious that it is not essential to the present invention that the tube 50 and shaft 52 be circular in section as other shapes may be substituted therefor and substantially the same results obtained. However, it is necessary where the tube and shaft are circular in section as illustrated in Fig. 5, that the rubber 56 either be bonded to the cooperating surfaces thereof or else be inserted in place in such a manner that it acts expansively against such surfaces to maintain it against slipping relative to such surfaces. In Fig. 6 a modified form of construction is illustrated where such requirements are not true. Referring to Fig. 6 it will be noted that the outer tube member 90, which corresponds to the tube 50 previously described, is of irregular contour and formed to provide a plurality, specifically four in the example shown, longitudinally extending internal grooves or axially extending pockets 92 and a shaft 94, which corresponds to the shaft 52 previously described, is positioned therein and has secured thereto a corresponding numer of outwardly projecting keylike members 96 which lie within the grooves 92. The space between the shaft 94 and keys 96 and the tubes 90 is filled with rubber 98 which serves the same purpose of the rubber 56 previously described. In this construction there is no need of bonding the rubber 98 to either the tube 90 or the shaft 94 and keys 96 due to the irregular contour of these members, but such bonding may be provided if desired.

It will also be apparent that in the broader aspects of this invention, it is not always necessary that members such as the tubes 50 and shaft 52 be employed, but other constructions may be provided for effecting substantially the same result. For instance, referring to Fig. 7, one modification is shown comprising a pair of plate-like brackets 100, one of which is adapted to be secured to one end of the engine 34 and the other of which is adapted to be secured to the corresponding reinforcement member 58, as by means of bolts 102. The plates 100 are bonded to a central plate 104 through a layer of rubber 106. One assembly of the character shown in Fig. 7 may be secured to each end of the engine 34 illustrated in Figs. 1 and 2 in approximately the same position as the ends of the shaft 52 therein so as to support the engine 34 between them and, because of the resilient characteristics of the rubber 106, will permit the engine 34 to rock and function in substantially the same manner as previously described.

Another modified form of construction which includes a rubber connected bracket assembly adapted to be positioned at each side of the frame in a manner similar to that described in connection with Fig. 7 is shown in Fig. 8, and each of which includes a bracket member 110 adapted to be fixed with respect to the corresponding part of the engine and a bracket member 112 which is adapted to be fixed with respect to the corresponding side of the vehicle frame. The brackets 110 and 112 are preferably provided with overlapping ledge portions connected together by an interposed rubber element 114 which acts to space them vertically. As indicated in the drawings these ledge portions of the members 110 and 112 are preferably of opposed V shape in elevation with the points of the V opposed for the reason that with this arrangement the axis of rocking movement between the two brackets will be located approximately between the points of the V.

In the construction illustrated in Fig. 7 rocking movement of the engine will be resisted by torsional stresses and to some extent shearing stresses in the rubber, while in the construction illustrated in Fig. 8 half of the rubber will be in compression and the other half in tension regardless of the direction of rocking movement of the engine.

It is not to be understood that the present invention is limited to motor vehicle constructions in which the engine is located at the rear or in which the engine is disposed with its crank shaft axis disposed transversely of the length of the vehicle frame, but may be applied to other constructions with the same beneficial results as those above described. For instance, referring to Fig. 9, a motor vehicle is illustrated having chassis frame side rails 120 and a power plant unit indicated generally at 122 located at the forward end of the frame members 120 and adapted to drive the front wheels (not shown) of the vehicle. The particular motor unit shown includes an engine 124, a clutch and transmission housing 126 fixed thereto, and a final drive unit 128. A tube 130 is fixed to the forward face of the engine cylinder block in any suitable manner and corresponds with the tube 50 previously described. A hollow shaft 132 is enclosed within the tube 130 and is spaced therefrom by a layer of rubber 134, the whole construction corresponding with the tube 50, shaft 52 and rubber 56 in the previously described construction. In this particular case the ends of the shaft 132 are shown as being secured to upstanding bracket members 136 secured to the respective side rails 120. It will be observed that the axis of the shaft 132 is proximate to the center of mass of the motor unit 122 and that rocking movement of the engine 124, together with the entire motor unit 122, will occur about the axis of the shaft 132 in response to variations in torque and brake reactions in the same manner as previously described. Unbalanced condition of the engine 124 tending to cause vibratory movement of the engine about its crank shaft axis may not be so readily absorbed as in the previously described construction but the yielding and vibration insulating qualities of the rubber 134 will aid materially in reducing the transmission of such vibration to the vehicle frame, particularly where the rubber 134 is thick enough to allow additional rocking of the engine in a plane perpendicular to the axis of its crank shaft. Any suitable means may be employed in connection with this construction for limiting the maximum amount of rocking movement permissible, one form being shown in Fig. 10 comprising a plate member 138 fixed to the engine and projecting between a pair of rubber blocks 140 carried by spaced brackets 142 secured to the side rail 120. The rubber blocks 140 are normally spaced from the plate 138 in the manner indicated and may be varied as mentioned in connection with the description with the rubber blocks 82 in Fig. 2.

In Fig. 11 is shown a novel form of final drive unit, which may be applied to either a front or rear wheel drive motor vehicle but is shown, by way of illustration, in its application to a front wheel drive motor vehicle. The engine itself includes a crank case 150 carrying a plurality of radially extending cylinders 152 which have common manifolding means 154. The axis of the engine crank shaft (not shown) is disposed at an angle of substantially 45° with respect to the horizontal and vertical and in a plane corresponding with a vertical plane passing through the longitudinal axis of the motor vehicle. To the front or lower face of the crank case 150 is secured a clutch housing 156 enclosing a conventional clutch mechanism; to the front or lower face of the clutch housing 156 is secured a transmission housing 158 which may enclose a conventional transmission mechanism; and to the front or lower face of the transmission housing 158 is secured a final drive housing 160 which may contain a conventional final drive mechanism including, in the case shown, a worm and wheel and differential mechanism (not shown) for driving axle shafts 162. The actual construction of the clutch, transmission and final drive mechanism being conventional, no effort is made herein to show the specific mechanism thereof involved. All of this mechanism which forms a complete and single unit is shown mounted on the frame side rails 164 of the motor vehicle through brackets 166 secured thereto and a tube 168, shaft 170, an intervening layer of rubber 172 in substantially the same manner as indicated in Fig. 9. Means similar to that illustrated in Figs. 2 and 10 may, of course, be provided in connection with this construction for limiting the maximum amount of rocking movement of the unit with respect to the frame.

It will be observed that with this construction a driving unit of minimum dimensions longitudinally of the vehicle is provided and at the same time one that is simple and compact and particularly lends itself to a realization of a maximum amount of body space in a motor vehicle.

It may also be noted that in some cases it may be desirable that the supporting means be initially placed under stress tending to rotate the engine and/or power unit toward one limit of its rocking position, for instance so that the the rubber will always be stressed in the same direction through the entire range of permissible rocking movement of the engine. This may be effected in all of the constructions shown. As a matter of illustration, in the construction shown in Figs. 1 to 5 inclusive, the brackets 66 may initially be placed on the shaft 52 in angularly offset relation with respect to the frame, and when applied in place the arms 70 and 72 rotated to their proper position and secured, thus causing one of the rubber bumper blocks 82 to abut against the plate 80 and place the rubber 56 between the shaft 52 and tube 50 under an initial tension.

Formal changes may be made in the specific embodiment of the invention described without departing from the spirit or substance of the broad invention, the scope of which is commensurate with the appended claims.

1. In a motor vehicle, in combination, a chassis frame including side rails, an engine disposed between said side rails, and means including a shaft and an enclosing tube yieldably secured together against relative rotation forming substantially the sole means of supporting said engine on said frame and limiting its rotation about the axis of said shaft.

2. In a motor vehicle, in combination, a chassis frame including side rails, an engine disposed between said side rails, a member extending between said side rails, a tube enclosing at least a portion of the length of said member and fixed to said engine, and rubber interconnecting said tube and member and yieldably permitting rocking movement of said engine about said member while limiting the degree of said rocking movement.

3. In a motor vehicle, in combination, driving road wheels, an engine unit including a final drive mechanism, and frame, resilient means interconnecting said engine and a frame adapted to support substantially the entire weight of said engine unit for rocking movement independently of said wheels about an axis transverse to the length of said vehicle and spaced from the axis of said wheels, and means for limiting said rocking movement comprising a pair of spaced yielding abutments and a member having a limited amount of free movement therebetween, fixed respectively to said frame and engine.

4. In a motor vehicle, in combination, a frame including side rails, an engine between said side rails, and means for supporting substantially the entire weight of said engine including a single bracket assembly adjacent each side rail, each assembly comprising a pair of metallic members fixed relative to said engine and frame respectively and connected together through a yieldable means serving as the major limiting means for rocking movement of said engine.

5. In a motor vehicle, in combination, a frame including side rails, an engine between said side rails, and means for supporting said engine for rocking movement in a fore and aft direction relative to said frame comprising a bracket assembly adjacent each side rail, each assembly including a pair of members fixed respectively against movement with respect to said engine and with respect to said frame, and a rubber member between each pair of the first mentioned members serving as the major limiting means for rocking movement of said engine.

6. In a motor vehicle, in combination, a frame having side rails, a bracket including a pilot secured to each of said side rails, an engine, a shaft secured to said engine, a sleeve slidably but non-rotatably engaging each end of said shaft and the corresponding of said pilots, means for locking said sleeves against rotation relative to said side rails, and means for locking said sleeves against movement axially in at least one direction on said shaft.

7. In a motor vehicle, in combination, an engine, and frame, resilient means interconnecting said engine and frame adapted to support substantially the entire weight of said engine for rocking movement about an axis transverse to the length of said frame, and means for limiting said rocking movement, said resilient means being under an initial stress constantly urging said engine toward one limit of its rocking movement.

8. In a motor vehicle, in combination, a frame, an engine, a differential mechanism, a pair of driving road wheels, means interconnecting said engine and said differential mechanism, articulated means interconnecting said differential mechanism and said wheels, and means common to both said engine and differential mechanism for resiliently resisting torque reactions therein, said means interconnecting said engine and frame for relative rocking movement approximately about a line extending transverse to the longitudinal axis of said vehicle.

9. In combination, a frame, an internal combustion engine, a tube secured to said engine, a member extending through said tube and fixed with respect to said frame, and yieldable means interposed between said tube and member, said tube, member and yieldable means forming substantially the sole support for said engine in said frame and being so constructed and arranged as to permit rocking movement of said engine about the axis of said tube and to limit the amount of said rocking movement by torsional stress set up in said yieldable means, as well as supporting substantially the entire weight of said engine.

10. In a motor vehicle, in combination, a frame, driving road wheels, a unitary driving unit therefor including an engine, transmission and final drive mechanism including a differential, articulated means interconnecting said differential and said wheels, a pivot member secured to said engine, a pivot member secured to said frame, and resilient means interposed between said pivot members for supporting said unit from said frame for rocking movement substantially about a horizontal axis disposed transversely to the length of said frame.

11. In a motor vehicle, in combination, a chassis frame including side rails, driving road wheels, a unitary power plant including an engine, transmission and final drive mechanism including a differential disposed between said side rails, articulated means interconnecting said final drive unit and said wheels, and yieldable means connecting said unit and said side rails forming a single line of support for said unit for rocking movement in a vertical plane disposed longitudinally of said frame.

12. In a motor vehicle, in combination, a frame structure, a pair of driving road wheels, a unitary power plant including an engine, clutch, transmission and differential mechanism, articulated means interconnecting said differential and road wheels, and means forming a substantially single pivotal axis extending transverse to the length of said motor vehicle common to both said engine and differential for resiliently resisting torque reactions therein so constructed and arranged as to permit an appreciable amount of oscillation of said power plant thereabout.

13. In a motor vehicle, in combination, a frame structure, a pair of driving road wheels, a unitary power plant including an engine, clutch, transmission and differential mechanism, articulated means interconnecting said differential and road wheels, and a common means for supporting said power plant for an appreciable amount of oscillation of said power plant about a substantially single line of pivot extending transverse to the length of said motor vehicle, and resiliently resisting torque reactions in both said engine and differential.

14. In a motor vehicle, in combination, a frame structure, a pair of driving road wheels, a unitary power plant including an engine, clutch, transmission and differential mechanism, articulated means interconnecting said differential and road wheels, and rubber means common to both said engine and differential for transmitting the weight thereof to said frame, permitting an appreciable amount of oscillation thereof about an axis transverse to the length of said vehicle, and for resiliently resisting torque reactions in both thereof due to torsional stresses set up in the said rubber means.

15. In a motor vehicle, in combination, a frame structure, a pair of driving road wheels, a unitary power plant including an engine, clutch, transmission and differential mechanism, articulated means interconnecting said differential and road wheels, and resilient means for supporting said power plant in said frame for rocking movement about a line transverse to the length of said vehicle and for resisting torque reactions in both said engine and said differential by torsional stresses set up therein by said rocking movement.

16. In combination, a frame, an internal combustion engine, members having a common axis arranged in telescopic relation with respect to one another and with said axis transverse to the length of said frame, at least one of said members being secured to said frame and the other thereof being secured to said engine, and resilient means interposed between said members and being secured against movement with respect thereto, said members serving to transmit substantially all of the weight of said engine to said frame and said resilient means serving to resist pivotal movement of said engine about said axis of said members.

17. In a motor vehicle, in combination, a frame structure, a pair of driving road wheels, a unitary power plant including an engine, clutch, transmission and differential, articulated means interconnecting said differential and road wheels, means coacting between said frame and power plant forming a support for said power plant on said frame for rocking movement about a line extending transverse to the length of said vehicle, and resilient means coacting between said frame and power plant for resisting said rocking movement.

18. In a motor vehicle, in combination, a frame structure, a pair of driving road wheels, a unitary power plant including an engine having the axis of its crankshaft disposed transversely to the length of said vehicle, a transmission and differential, articulated means interconnecting said differential and road wheels, means coacting between said frame and power plant forming a support for said power plant on said frame for rocking movement about a line extending transverse to the length of said vehicle, and resilient means coacting between said frame and power plant for resisting said rocking movement.

19. In a motor vehicle, in combination, a frame structure, a pair of driving road wheels, a unitary power plant including an engine having the axis of its crankshaft disposed transversely to the length of said vehicle, a transmission and differential, articulated means interconnecting said differential and road wheels, and means coacting between said frame and power plant forming a support for said power plant on said frame for rocking movement about a line extending transverse to the length of said vehicle.

ROSCOE C. HOFFMAN.